United States Patent
Biswas et al.

(10) Patent No.: US 9,912,670 B2
(45) Date of Patent: Mar. 6, 2018

(54) RESOURCE FEATURE TRANSFER

(71) Applicant: Adobe Systems Incorporated, San Jose, CA (US)

(72) Inventors: Sanjeev Kumar Biswas, Bangalore (IN); Mayank Goyal, Noida (IN); John A. Trammel, Bothell, WA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 149 days.

(21) Appl. No.: 15/132,942

(22) Filed: Apr. 19, 2016

(65) Prior Publication Data
US 2017/0302676 A1 Oct. 19, 2017

(51) Int. Cl.
*G06F 21/00* (2013.01)
*H04L 29/06* (2006.01)
*G06F 21/31* (2013.01)
*G06F 21/62* (2013.01)

(52) U.S. Cl.
CPC ............ *H04L 63/102* (2013.01); *G06F 21/31* (2013.01); *G06F 21/62* (2013.01); *H04L 63/08* (2013.01)

(58) Field of Classification Search
CPC .... G06F 21/62; G06F 21/604; G06F 21/6218; G06F 21/6227; G06F 21/629; G06F 21/30; G06F 21/31; G06F 21/335; G06F 21/45
See application file for complete search history.

(56) References Cited

U.S. PATENT DOCUMENTS

2006/0184997 A1* 8/2006 La Rotonda .......... G06Q 10/10 726/2
2013/0067594 A1* 3/2013 Kantor ................ G06F 21/6218 726/28

* cited by examiner

*Primary Examiner* — Edward Zee
(74) *Attorney, Agent, or Firm* — Wolfe-SBMC

(57) ABSTRACT

Resource feature transfer is described. In one or more embodiments, information is collected about interaction of an unauthenticated user of a computing device with a resource, such as content (e.g., a web page) or an application. The information may identify the user, a device or application used to interact with the resource, and so on. This information is communicated to an identity management service (IMS) to determine features to make accessible to the unauthenticated user when interacting with the resource. During the interaction, the user initiates authentication to a corresponding user profile. To achieve a consistent user experience, the features made accessible to the user when unauthenticated are transferred so they are also accessible when authenticated. To do this, authentication information is communicated to the IMS with a token indicating the features determined for the unauthenticated user. The IMS then merges these features with features indicated by the user profile.

18 Claims, 7 Drawing Sheets

RESOURCE FEATURE TRANSFER

BACKGROUND

Advances in computing technology enable resource providers (e.g., providers of content, applications, and so on) to vary the experiences that different users have when interacting with resources. One example of varying a user experience, is to vary the content shown to different users who visit a same web page. Resource providers, in this case a website provider, can vary user experiences based on information associated with the different users, such as a browser used to access the web page, a device via which the web page is accessed, demographic information of the users, status of the users as being authenticated or unauthenticated to the website, and so forth.

One approach for varying user experiences with resources, and tracking how the varied experiences affect user interaction with those resources or related resources, is called "AB testing". In "AB testing" a resource provider delivers at least two different versions of a resource and measures differences in user interaction between the versions. Generally, this approach can be used to determine whether new features of a resource (e.g., additional, different, or less functionality, different content, rearrangement of a user interface, and so forth) have a positive, negative, or no effect on user interaction with the resource.

In application, AB testing may cause experiences of different users who are unauthenticated to a resource to be varied. Accordingly, one group of unauthenticated users may be presented with a first version of the resource (e.g., a control version of the resource) and a different group of unauthenticated users may be presented with a second version (e.g., a variation of the resource from the control version, which has one or more different features from the control version). At some point, a user may authenticate, such as by signing-in with a username and password. Ideally, after authentication the user is presented with a version of the resource that includes resource features that were already accessed so that the user experience is consistent. In other words, if the user is presented the control version when unauthenticated, then when authenticated, the user is also presented features corresponding to the control version.

Conventional techniques for enabling consistent user experiences between unauthenticated and authenticated states have several drawbacks, however. One conventional technique uses "cookies". Although cookies enable features presented to an unauthenticated user to be tracked, the data that cookies store may be generated for different users or for different interaction sessions. Further, cookies are not a secure mechanism for storing potentially identifying data. Cookies also do not guarantee that a particular user who logs-in to different browsers or uses different devices will be presented with consistent features across the different browsers and devices. Broadly speaking, some conventional techniques are unable to keep track of users across different devices or across different applications, e.g., across different web browsers. This can result in presenting users with inconsistent features when switching between devices or applications. Thus, conventional techniques suffer from a variety of drawbacks, some of which may result in a failure to accurately capture user sentiment toward different features of a resource.

SUMMARY

Resource feature transfer is described. In one or more embodiments, a feature transfer module collects information that describes an unauthenticated user of a computing device and how the unauthenticated user interacts with a resource, such as content (e.g., a web page) or an application. For example, the information may serve to identify the user, the type of device used to interact with the resource, an application used to interact with the resource, the resource itself, and so on. The feature transfer module communicates this information in the form of feature-relevant parameters to an identity management service. The identity management service uses the parameters to determine which features to make accessible to the unauthenticated user when interacting with the resource, and returns the determined features encoded in a token. The token enables applications of the computing device to present the resource to the unauthenticated user with the determined features.

At some point during interaction with the resource or the application that enables presentation of the resource, the unauthenticated user initiates authentication to a corresponding user profile. The user may do so in order to access features he or she is authorized to access when authenticated. The features the authenticated user is authorized to access may correspond to additional, different, or more robust features than unauthenticated users, such as additional or different content, additional or different functionality, and so on. In order to achieve a consistent user experience, the techniques described herein cause the features made accessible to the user when unauthenticated to also be accessible when authenticated. To do so, the feature transfer module communicates authentication information (e.g., username and password) to the identity management service along with the token indicating the features determined for the unauthenticated user. The identity management service then merges the features indicated by the token with the features indicated by the user profile of the authenticated user. In other words, the identity management service updates the features indicated by the user profile to include those indicated by the token. Using an indication of the merged features, the computing device's applications can present resources to the authenticated user with the features indicated by the user profile and also with the features determined for the user when unauthenticated.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
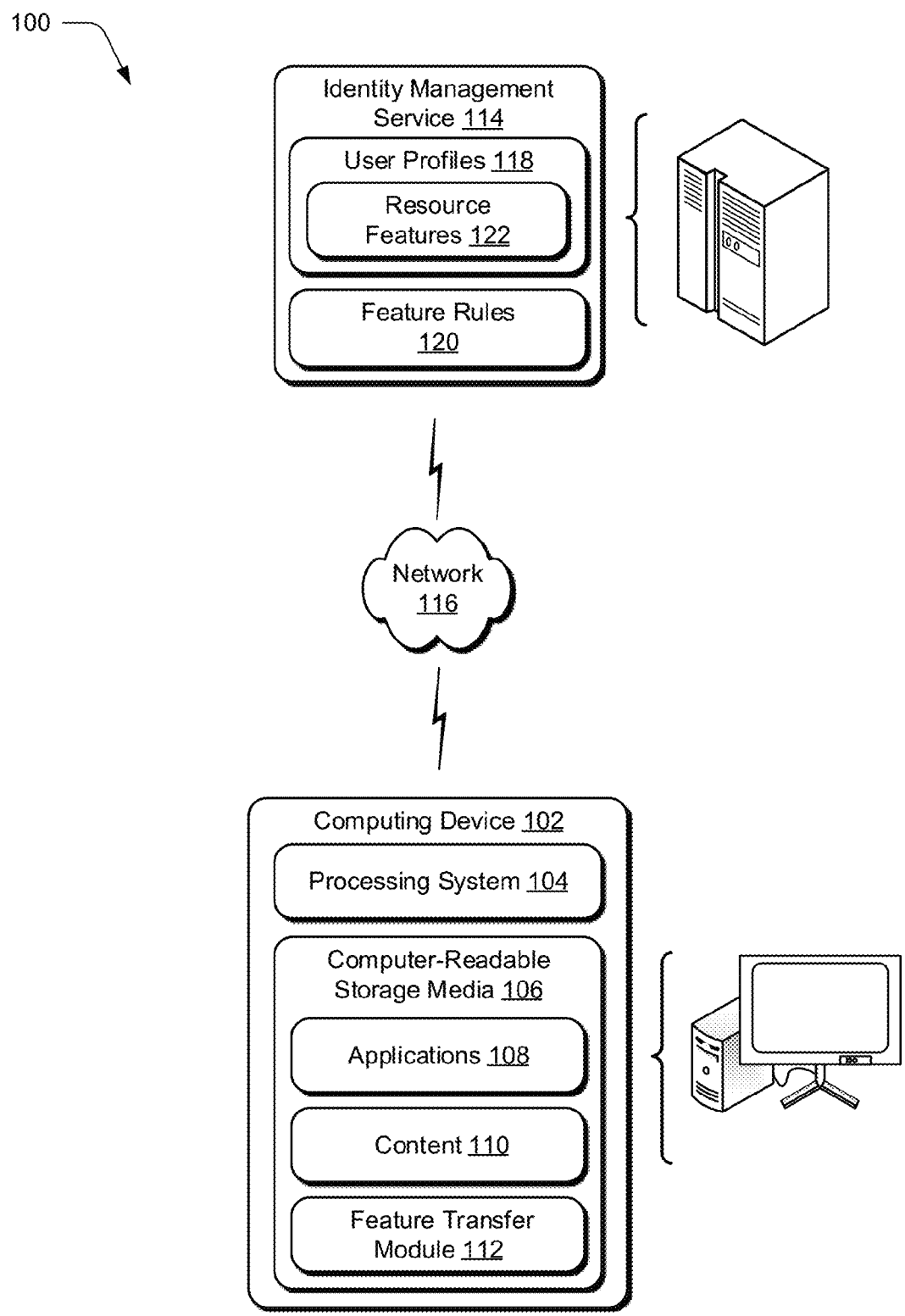
FIG. 1 is an illustration of an environment in an example embodiment that is operable to employ techniques described herein.

Users interacting with a resource may do so initially in an unauthenticated mariner, e.g., the user is not yet authenticated to a user profile that enables authenticated interaction with the resource. As used herein a "resource" refers to any content or applications that can be presented to a user via a computing device and with which a user can interact. Examples include, by way of example and not limitation, web pages, desktop and mobile applications, user interfaces, broadcast shows, broadcast advertisements, online shopping services, streaming content, and so on. At some point, a user may authenticate, such as by signing into an account with a username and password. After authentication, a user ideally is presented with a version of a resource that includes features the user was able to access while unauthenticated, so that the user experience is consistent. As used herein, the term "feature" refers to a content item accessible to the user, functionality accessible to the user, arrangement of content or functionality (e.g., arrangement of a user interface), manner in which content or functionality is delivered (e.g., delivered as one or more of text, image, audio, video, sensory feedback), and so forth.

The issue of maintaining consistent user experiences stems from the ability to deliver multiple different versions of a resource. By way of example, a resource, such as a web page or an application, may be delivered so that different versions, having different features are presented to different users in order to determine whether feature changes improve a user experience with the resource (or with a related resource). Conventional techniques for enabling consistent user experiences between unauthenticated and authenticated states have several drawbacks, however. For instance, some conventional techniques are unable to keep track of users across different devices or across different applications (e.g., across different web browsers). This can result in presenting users with inconsistent features when switching between devices or applications. Due to these inconsistencies, it may be difficult using conventional techniques to determine user sentiment toward different features of a resource.

Resource feature transfer techniques are described. In one or more embodiments, a user initiates interaction with a resource (e.g., a web page), and, at first does so in an unauthenticated manner. A client application (e.g., a web browser) that loads the resource, as part of the loading, submits a set of feature-relevant parameters to an identity management service. A feature-relevant parameter includes, by way of example and not limitation, an identifier for the unauthenticated user, an identifier of a device used to interact with the resource, an identifier of the resource, an identifier of an operating system, and so forth. The identity management service then returns an indication of features that are to be made accessible to the unauthenticated user when interacting with the resource. For example, the identity management service may generate a "token" that includes data indicative of the features determined for the unauthenticated user, and return the token. As used herein, the term "token" refers to a data item that can be configured to indicate features of a resource that are to be made available to a user, such as to the unauthenticated user. This token can differ from a cookie insofar as the identity management service creates the token to hold encoded features that are embedded in the token. These encoded features that are embedded in the token enable the corresponding features to be made accessible in subsequently accessed resources.

Based on the token, the client application makes the resource available to the unauthenticated user with the features determined by the identity management service. At some point, the user authenticates, e.g., by signing-in to a corresponding user profile. The user may authenticate, for instance, to obtain authorization to use one or more features available to authenticated users but not unauthenticated users. Examples of such features can include additional content, ad-free content, additional functionality, functionality that makes certain workflows with content easier, and so on.

In any case, after authentication, users typically expect to have access to both the features that were accessible while unauthenticated and those they are authorized to use once authenticated. The ability to make resource features that were accessible while unauthenticated also available when the user becomes authenticated is referred to herein as "transferring". Even if users do not expect resource features to be transferred so that the features are accessible in both unauthenticated and authenticated states, doing so can result in more consistent user experiences. To enable such resource transfer, the client application communicates the token back to the identify management service as part of the authentication process. The identity management service extracts the features made available to the unauthenticated user through the token, and merges these with the features the user is authorized to use when authenticated. The identity management service may do so by merging the features indicated in the token into a user profile maintained for the authenticated user.

The merging allows the identity management service to provide an indication to the client application of the features to make accessible to the authenticated user in conjunction with the resource and related resources, e.g., both the features made accessible to the user when unauthenticated and the features the user is authorized to use as a result of being authenticated. In so doing, the burden of determining which features to transfer for use by the authenticated user may be removed from the client application and from a client device. Further, this enables feature transfer when interacting with a resource across different client applications (e.g., different web browsers), different platforms (e.g., operating systems), different devices, and so on. Additionally, the techniques described herein enable a more secure transfer of features and enable a more consistent user experience, in terms of features made accessible in connection with a resource and related resources, than conventional techniques.

In the following discussion, an example environment is first described to employ the techniques described herein. Example implementation details and procedures are then described which are performable in the example environment as well as other environments. Consequently, performance of the example procedures is not limited to the example environment and the example environment is not limited to performance of the example procedures.

Example Environment

FIG. 1 is an illustration of an environment 100 in an example embodiment that is operable to employ techniques described herein. The illustrated environment 100 includes a computing device having a processing system 104 that includes one or more processing devices (e.g., processors) and one or more computer-readable storage media 106. The illustrated environment 100 also includes applications, content 110, and a feature transfer module 112 embodied on the computer-readable storage media 106 and operable via the processing system 104 to implement corresponding functionality described herein. In at least some embodiments, the computing device 102 includes functionality to access various kinds of web-based resources (content and services), interact with online providers, and so forth as described in further detail below.

The computing device 102 is configurable as any suitable type of computing device. For example, the computing device 102 may be configured as a server, a desktop computer, a laptop computer, a mobile device (e.g., assuming a handheld configuration such as a tablet or mobile phone), a tablet, a device configured to receive gesture input, a device configured to receive three-dimensional (3D) gestures as input, a device configured to receive speech input, a device configured to receive stylus-based input, a device configured to receive a combination of those inputs, and so forth. Thus, the computing device 102 may range from full resource devices with substantial memory and processor resources (e.g., servers, personal computers, game consoles) to a low-resource device with limited memory and/or processing resources (e.g., mobile devices). Additionally, although a single computing device 102 is shown, the computing device 102 may be representative of a plurality of different devices to perform operations "over the cloud" as further described in relation to FIG. 7.

The environment 100 further depicts identity management service 114, which is an example of one or more service providers that are configured to communicate with computing device 102 over a network 116, such as the Internet, to provide a "cloud-based" computing environment. Generally speaking, service providers such as the identity management service 114 are configured to make various resources available over the network 116 to clients. In some scenarios, users sign up for accounts that are employed to access corresponding resources from a provider. The provider authenticates credentials of a user (e.g., username and password) before granting access to an account and corresponding resources. Other resources are made freely available, (e.g., without authentication or account-based access). The resources can include any suitable combination of services and/or content typically made available over a network by one or more providers. By way of example and not limitation, such services include, but are not limited to, social networking services (e.g., Facebook®, Instagram®, Twitter®, and so on), content creation and editing services (e.g., Adobe® Creative Cloud which includes Photoshop®, Illustrator®, Audition®, and so on), news services, digital content storage and/or sharing services, cable and satellite television services, content streaming and/or download services, and so forth.

Service providers may serve as sources of significant amounts of content and various applications, such as mobile and desktop applications. As described above, a "resource" refers to any content or applications that can be presented to a user via a computing device and with which a user can interact. Thus, the applications 108 and the content 110 illustrated in FIG. 1 are examples of resources. Applications 108 represent the applications that are accessible to a user of the computing device 102. By way of example, the applications 108 can include web browsers, productivity applications, applications that provide specialized functionality for and access to a social networking service, applications that provide functionality which enables a user to create or edit content, applications that provide specialized functionality for and access to a news service, applications that are specialized for mobile device use, applications that are specialized for tablet use, applications that are specialized for desktop use, and so on. The applications 108 may represent a variety of different types of applications without departing from the spirit or scope of the techniques described herein.

Content 110 represents content that is accessible to a user of the computing device. The content 110 represents a variety of different content that may be stored at the computing device 102 or accessible at least temporarily to a user. By way of example, and not limitation, the content 110 can include web pages (and the text, images, videos, markup language, and metadata thereof), images, videos, documents, and so on. Regardless of the content 110 maintained by or accessible via the computing device 102, it can be formatted in any of a variety of different digital formats. When the content 110 corresponds to an image or includes an image, for instance, the image can be formatted in formats including but not limited to JPEG, TIFF, RAW, GIF, BMP, PNG, and so on. It is to be appreciated that the content 110 may correspond to a variety of different types of content. To this extent, the content 110 can include a variety of differently formatted files. In any case, the content 110 may represent a variety of other types of content without departing from the spirit or scope of the techniques described herein.

The feature transfer module 112 along with the identity management service 114 represent functionality to implement aspects of techniques for resource feature transfer. Consider an example, in which a user of the computing device 102 uses one of the applications 108 which is configured as a web browser to navigate to a particular web page. In this example, the user is not yet authenticated to the web page, or authenticated to the website of which the page is part. Based on the navigation, a service provider hosting the web page communicates to the computing device 102 content that allows the web page to be presented to the unauthenticated user, and which is represented by the content 110. However, there are in this example at least two different versions of the web page, which have different features from one another. A provider of a website may provide different versions of a web page having different features, for example, when performing an AB test to determine whether new or changed features impact user interaction with the web page (or related pages) negatively, positively, or not at all. In a scenario in which the web page corresponds to an online shopping service, for instance, a '1-click' checkout button may be added to an item page. AB testing may be performed by delivering versions of the page with and without the button to determine whether the addition of the button increases sales of the item, decreases them, or has no impact.

In any case, to determine which version of the web page is to be presented to the user, and thus which features are made accessible to the user as part of the web page, the feature transfer module 112 collects information for a variety of different parameters to send to the identity management service 114. By way of example, the parameters can include a user identifier assigned to the unauthenticated user, a browser identifier to identify the web browser being used, and a variety of other parameters the identity management service 114 can use to determine which features are to be made accessible to the user. As illustrated, the identity management service 114 includes or has access to user profiles 118 and feature rules 120. The user profiles are illustrated with resource features 122, which represent data that indicates which features for a web page, a website, application, and so on, are authorized for a given user profile. Thus, the resource features 122 represent the features that are to be made accessible to a user who is signed-in to a corresponding user profile, e.g., authenticated. In this way, when the user signs-in to a corresponding user profile, even at different devices or on different platforms, the user may be given access to the appropriate set of features in conjunction with the resource.

Feature rules 120 represent the rules for determining which features are to be made accessible to users in conjunction with a resource. In the continuing example in which the resource under consideration is a web page accessed via a web browser, the feature rules 120 can specify that users accessing the resource from a desktop are to have a first set of features made accessible to them while users accessing the resource from a mobile phone are to have a second different set of features made accessible to them. Since this information is captured in the parameters collected by the feature transfer module 112 and communicated to the identify management service 114, the identity management service 114 can determine which features are to be made accessible to the user of the computing device 102 based on the parameters. In accordance with the determination, the identity management service 114 communicates a token to the computing device 102 that indicates the determined features to be made accessible with the resource, e.g., the second set of features if the computing device 102 is the mobile device.

When loading the web page, the web browser can thus instantiate the page so that the page has the features indicated by the token. At some point during interaction with the web browser, the unauthenticated user initiates authentication, e.g., the user navigates to a web page where the user can sign-in with a username and password (or with biometrics) to a corresponding one of the user profiles 118. The user may do so to access features he or she is authorized to use according to the resource features 122 associated with the corresponding user profile. Along with the authentication process, the feature transfer module 112 can communicate the token, indicative of the features made accessible to the user when unauthenticated, back to the identity management service 114. The identity management service 114 is configured to extract the features indicated in the token and to merge the extracted features with the resource features 122 authorized for the user profile. In this way the resource features 122 associated with the user profile are modified so that the resource features include the features the user is authorized to use when authenticated and also those that were made accessible to the user when unauthenticated, e.g., as part of testing whether the features improve user interaction with the resource.

Accordingly, when the authenticated user interacts with the resource or with related resources (e.g., when the resource is a web page, related resources may correspond to other pages of a corresponding website), the identity management service 114 can indicate each of the features that are to be made available to the user. The applications 108 of the computing device 102, in the continuing example the web browser, can process this information provided by the identity management service 114 to make those features available in conjunction with the resource. In this way, the features made accessible to the user in conjunction with the resource when unauthenticated can be transferred so that those features are also accessible when the user is authenticated.

In one or more embodiments, the feature transfer module 112 is implementable as a software module, a hardware device, or using a combination of software, hardware, firmware, fixed logic circuitry, etc. Further, the feature transfer module 112 can be implementable as a standalone component of the computing device 102 as illustrated. In addition or alternatively, the feature transfer module 112 can be configured as a component of a web service, an application, an operating system of the computing device 102, a plug-in module, or other device application as further described in relation to FIG. 7.

Having considered an example environment, consider now a discussion of some example details of the techniques for resource feature transfer in accordance with one or more embodiments.

Resource Feature Transfer Details

Figure 2:
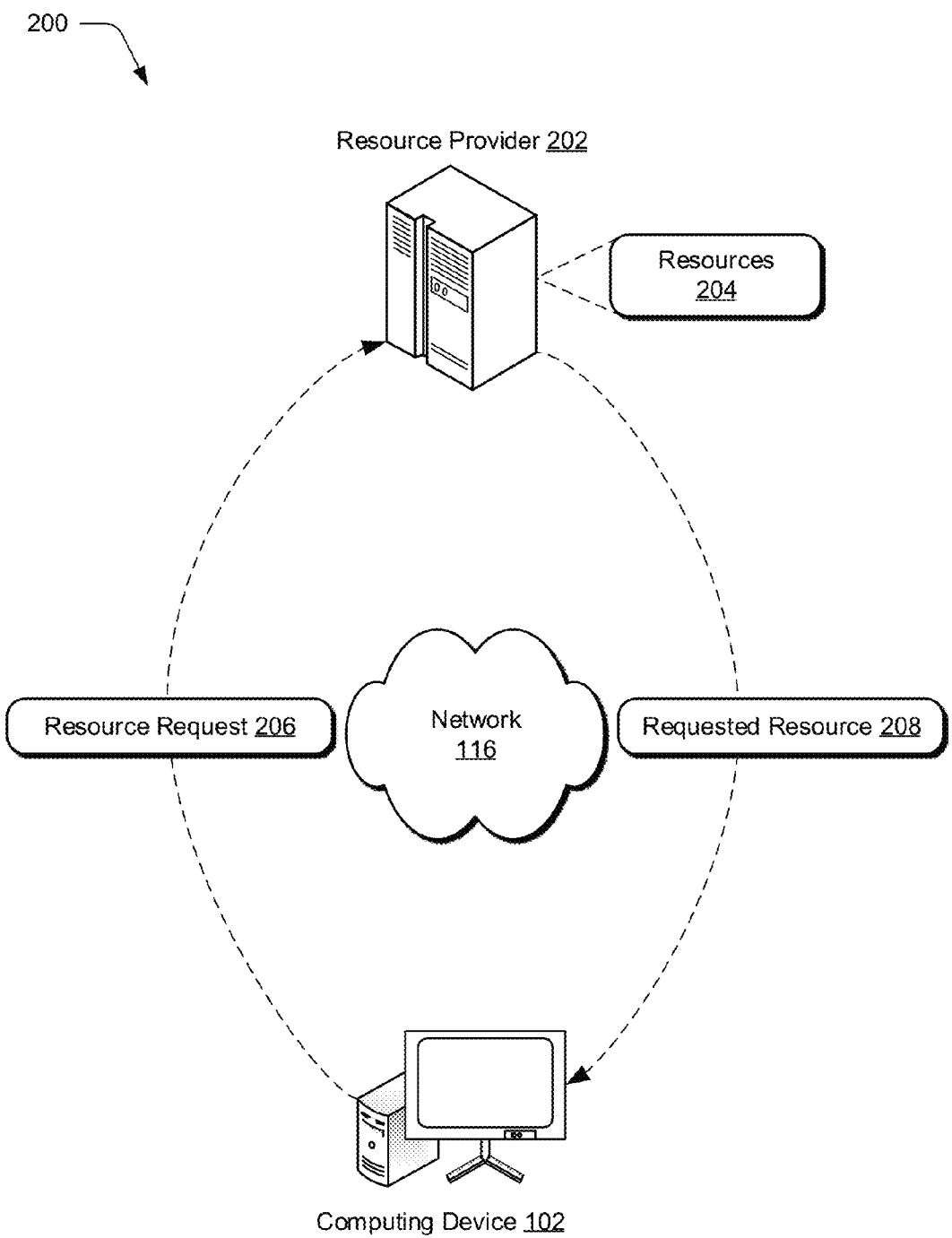
FIG. 2 is an example embodiment depicting components of FIG. 1 and interaction of those components with other components of the example embodiment.

This section describes some example details of resource feature transfer techniques in accordance with one or more embodiments. FIG. 2 depicts an example embodiment, generally at 200, in which the computing device 102 of FIG. 1 requests a resource from a service provider. The example embodiment 200 includes resource provider 202 which may be a service provider configured as described above with reference to the example environment 100. Further, the resource provider 202 includes or has access to resources 204, which represent any of various resources that may be made available by a service provider of the network 116 to clients. As discussed above, resources can include a variety of content and applications that can be made available to a user of the computing device 102.

In addition, FIG. 2 includes resource request 206 and requested resource 208. The resource request 206 represents a request made by the computing device 102 for one of the resources 204 from the resource provider 202. When a user of the computing device 102 interacts with a web browser to navigate to different web pages, for instance, the resource request 206 may correspond to a request for a particular web page. Since "resources" as used herein may correspond to a variety of content and applications, the resource request 206 should be understood as being capable of requesting a variety of different content or applications. By way of example, the resource request 206 may correspond to a request for streaming content, for broadcast content, for downloading an application, and so forth.

The resource provider 202 is configured to receive the resource request 206 and service the request. To do so, the resource provider 202 may generate one or more communications that include the resource or include data that allows a user of the computing device 102 access to the resource. The requested resource 208 represents a response of the resource provider 202 to the resource request 206 and may be configured as the one or more communications that include the resource or data that allows a user of the computing device 102 access to the resource. When a web page is requested, for instance, the requested resource 208 may correspond to content (e.g., text, images, videos, scripts, markup language, and so on) that allows the web page to be presented at the computing device 102. When a stream of content is requested, the requested resource 208 may correspond to a data stream. When an application is requested, the requested resource 208 can correspond to an installation package that includes compiled code, configuration files, and so on, that enable installation of the application on the computing device 102. Regardless of the particular resource is requested, the resource provider 202 is configured to provide the requested resource 208 to the computing device 102.

As mentioned above, the features made accessible as part of a resource can vary. In one or more embodiments, there may be multiple differences, in terms of features, between versions of a resource. With regard to applications, for example, feature differences may correspond to differences in functionality. In an image editing application, for instance, features may differ to change a work flow, such as to change the way cropping, blurring, selecting, and so on, are performed. Another example difference for an image editing application may be the availability of some feature that is not supported in another version, such as the ability to export an edited image into a proprietary format as well as commonly used formats. In contrast, a version (e.g., the control version) may have the ability to export edited images in just commonly used formats. The features that are capable of being varied depend largely on the resource. For instance, the features that can vary between versions of a web page may be different from the features that can vary between versions of a word processing application.

In one or more embodiments, information describing a user can be used to determine which version of a resource and hence, which features, to expose to the user. Broadly speaking, the identity management service 114 represents functionality to determine which version of a resource to expose to a user. The identity management service 114 may do so based on the feature rules 120. The feature rules 120 can specify that users meeting certain conditions can be associated with certain features. The identity management service 114 can indicate to applications of a computing device, for example, to make the determined features accessible to the user in conjunction with resources. With regard to the example depicted in FIG. 2, the identity management service 114 can indicate to the computing device 102 which version of the requested resource 208 (and thus which features) to make accessible to the user of the computing device 102.

Figure 3:
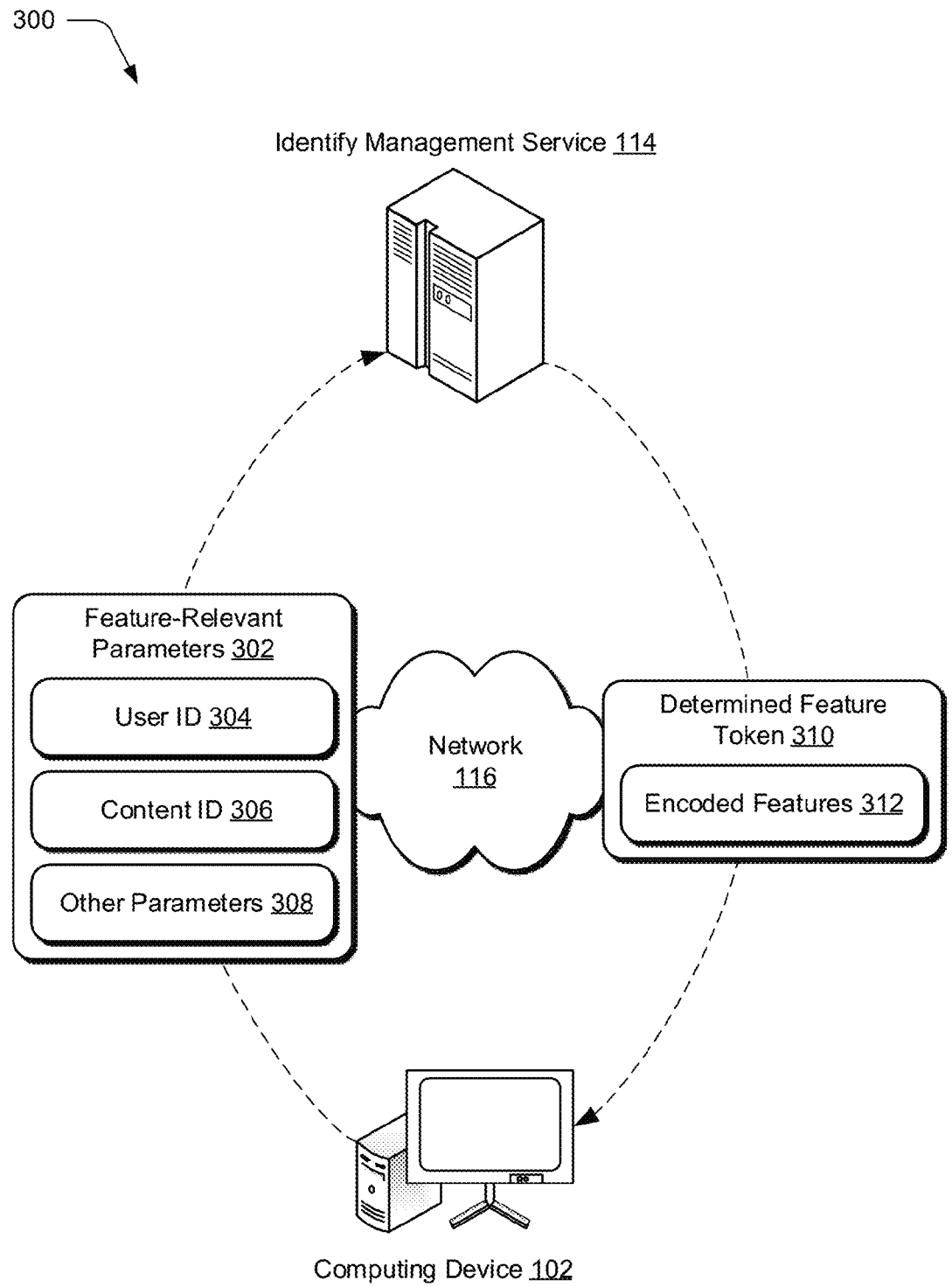
FIG. 3 is an example embodiment depicting components of FIG. 1 and interaction of those components based on the interaction of FIG. 2.

FIG. 3 depicts an example embodiment, generally at 300, in which a computing device requests an indication from an identity management service of features to make accessible to an unauthenticated user in conjunction with a resource.

The illustrated example includes feature-relevant parameters 302. The feature-relevant parameters 302 represent parameters collected by the feature transfer module 112 that enable the identity management service 114 to determine which features of a resource to make accessible to the unauthenticated user. In one or more embodiments, the feature transfer module 112 may be included with the resource. For example, the feature transfer module 112 may be a JavaScript library included as part of a resource. Additionally or alternatively, the feature transfer module 112 may be included as part of an application, both when the application corresponds to the resource and also when the application is used to present the resource, e.g., when the application is a web browser used to present a resource configured as a web page. The feature transfer module 112 may also be configured as part of an operating system of the computing device 102 so that it is available for use by any of the applications 108.

The feature-relevant parameters 302 collected by the feature transfer module 112 represent a variety of different information that describes the unauthenticated user. The feature-relevant parameters 302 may also describe how the unauthenticated user interacts with a resource. In the example embodiment 300, the feature-relevant parameters 302 include user ID 304, content ID 306, and other parameters 308. The user ID 304 may be a random identifier assigned to the unauthenticated user, e.g., such as a random globally unique identifier (GUID) assigned by Adobe® Target if the resource is integrated with Adobe® Target. The content ID 306 may correspond to an identifier that identifies the resource, e.g., a client identifier already assigned to the resource by the identity management service 114. The other parameters 308 may describe a variety of other feature-relevant characteristics about a user (e.g., demographics), the computing device 102 itself (e.g., device type, manufacturer, and so on), applications used to access resources, and so on.

In the illustrated example, the computing device 102, after receiving a resource, communicates the feature-relevant parameters 302 over the network 116 to the identity management service 114. Based on the feature-relevant parameters 302, the identity management service 114 determines which features of the resource are to be made accessible to the unauthenticated user. The identity management service 114 may do so based on a comparison of the feature-relevant parameters 302 to the feature rules 120. In response to the feature-relevant parameters 302, the identity management service 114 returns determined feature token 310. The determined feature token 310 includes encoded features 312. The encoded features 312 represent the features of the resource that are to be made accessible to the unauthenticated user.

When the determined feature token 310 is received, the resource can be presented to the user with the features represented by the encoded features 312. In one or more embodiments, the feature transfer module 112 makes the encoded features 312 accessible to the user in conjunction with the resource. Alternately or in addition, one of the applications 108 makes the encoded features 312 accessible in conjunction with the resource, e.g., a web browser when the resource is a web page. When a resource corresponds to a web page, for instance, the encoded features 312 may be presented to the user as part of the web page via a web browser.

Figure 4:
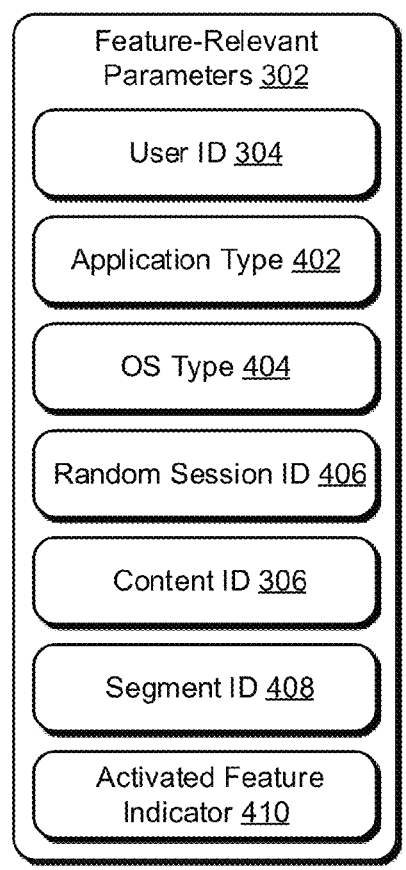
FIG. 4 is an implementation example depicting a communication configured to enable transfer of resource features to maintain a consistent user experience.

FIG. 4 depicts an implementation example, generally at 400, of a communication configured to indicate feature-relevant parameters. Such a communication enables transfer of resource features from unauthenticated to authenticated interaction with a resource—to maintain a consistent user experience. In particular, FIG. 4 depicts a specific implementation example of the feature-relevant parameters 302. Although in other embodiments, the feature-relevant parameters 302 may convey different parameters, in at least one embodiment the feature-relevant parameters 302 include the user ID 304 and the content ID 306 of FIG. 3, and also include application type 402, operating system type 404 (OS type 404), random session ID 406, segment ID 408, and activated feature indicator 410. The user ID 304 and the content ID 306 parameters may be configured to represent the information discussed above in relation to FIG. 3.

The application type 402 parameter may indicate an application used to present a resource. For instance, when the resource is a web page and the application used to present the web page is a web browser, the application type 402 parameter is usable to indicate the type of web browser, e.g., the application type 402 can be used to indicate whether the browser is Microsoft® Edge, Google® Chrome, Apple® Safari, and so on. When the resource is an application, the application type 402 parameter is usable to identify the application, e.g., the application type 402 can be used to indicate that the application is Adobe® Photoshop, Adobe® Premiere Pro, Adobe® Illustrator, Adobe® Audible, and so forth. In a similar fashion, the OS type 404 parameter may identify an operating system of the computing device 102. If the computing device 102 has multiple operating systems (e.g., using different partitions), then the OS type 404 parameter may identify the operating system used in connection with accessing the resource.

The random session ID 406 may be an identifier used to identify a session during which the user interacts with the resource. The random session ID 406 may also identify a session during which the user interacts with an application that enables access to the resource. In one or more embodiments, the random session ID 406 may correspond to a globally unique identifier (GUID) to identify the session. As used herein, a "session" refers to a period of time during which a user interacts in a substantially continuous manner with an application or content. One common example of a session is a "browsing session," which generally refers to a period of time during which a user interacts with a web browser to navigate to different web pages. A particular browsing session may end after a timeout period (e.g., a period of inactivity by a user with the web browser) or when the web browser is closed down (e.g., by the user, the operating system, or some fault in the web browser's operation). In a similar fashion, a "session" may end when a user ceases using an application enabling access to a resource or ceases using the resource itself (e.g., by initiating an end to the session). A session may also end after a timeout period. By way of example, the random session ID 406 parameter, may represent a first GUID generated for a first session during which a user interacts with an application. When the first session ends and the user later interacts with the application as part of a second session, the random session ID 406 may represent a second GUID for the second session.

The segment ID 408 parameter may identify one or more segments to which the unauthenticated user of the computing device 102, the computing device 102, or the components thereof, belong. For instance, the segment ID 408 may indicate an AB segment determined through an AB test, e.g., if segmentation has already been performed by Adobe® Target. To illustrate, the segment ID 408 may indicate that the computing device 102 is part of a test group segment, which generally is to be delivered new features—not merely features associated with a control version of a resource. Alternately, the segment ID 408 may indicate that the computing device 102 is part of a control group segment, which is generally to be delivered features associated with the control version of a resource—not new features that are being tested. These described segments are merely examples and should not be seen to limit the scope of the segments which the segment ID 408 may identify.

The activated feature indicator 410 may identify one or more features which have already been activated for the unauthenticated user, such as features that have been activated in conjunction with a particular resource during a current session. In one or more embodiments, the activated feature indicator 410 parameter may be used if segmentation has already been performed, such as by Adobe® Target in the manner described above.

As discussed above, the feature-relevant parameters 302 can be used to determine the features that are to be exposed when a user interacts with a resource. The determined features are encoded and communicated back to the computing device 102 as the encoded features 312 of the determined feature token 310. Using the determined feature token 310, the resource is presented to the user with the encoded features 312.

At this point though, the interaction of the user with the resource is unauthenticated. This may be the case because the user has not yet signed-in to a corresponding user profile. Further, since the user is not yet authenticated, the user is also not yet authorized to access features that are reserved for particular authenticated users. An authenticated user, for instance, may be authorized to access more and different content, more and different functionality, and so on. At some point during the session, however, the unauthenticated user may authenticate.

For example, the unauthenticated user may sign-in to a corresponding user profile 118, e.g., using a username and password, biometrics, and so on. The user profiles 118 include the resource features 122, which indicate the features that are to be made accessible to the authenticated user in conjunction with resources. In one example, the resource features 122 may correspond to a subscription level purchased by the authenticated user, such that when a subscription level is higher there are a greater number and potentially more robust features indicated by the resource features 122. Alternately or in addition, the resource features 122 may correspond to other criteria, such as demographic information of the authenticated user, preferences of the user, and so on. Although the authenticated user's user profile 118 indicates which resource features 122 are to be made accessible, the features that were made accessible to the user when unauthenticated may not yet be indicated by the user profile 118.

Along with authenticating the user, an application enabling interaction with a resource or the resource itself, may make a call to the feature transfer module 112. In conjunction with this process, the feature transfer module 112 is configured to enable features to be transferred from the unauthenticated portion of the session to the authenticated portion of the session. To do so, the feature transfer module 112 may send the determined feature token 310 with the encoded features 312 back to the identity management service 114. Alternately or in addition, the feature transfer module 112 may send the feature-relevant parameters 302 to the identity management service 114, and configure the activated feature indicator 410 to indicate the encoded features 312. The feature transfer module 112 may send the feature information (e.g., the determined feature token 310 or the activated feature indicator 410) along with authentication information (e.g., an entered username and password) to the identity management service 114.

With the feature and authentication information, the identity management service 114 updates the resource features 122 to include the encoded features 312. The identity management service 114 may also be configured to address any discrepancies between the encoded features 312 and the resource features 122. This may occur, for instance, when the resource features 122 indicate not to make a feature accessible to the authenticated user but the encoded features 312 made the feature accessible to the user when unauthenticated (e.g., before correspondence of the user to the user profile was known in the current session).

After merging the encoded features 312, the resource features 122 indicate the features that are to be made accessible to the authenticated user in conjunction with accessing resources. In this way, the features that were accessible during the unauthenticated portion of the user interaction session can be transferred to the authenticated portion of the user interaction session. This also enables the features that were made accessible to the user during the unauthenticated portion of the user interaction to be made accessible to the user across different applications and devices. For example, the user may use a different browser type and authenticate via the different browser, e.g., by signing-in to the corresponding user profile. In this scenario, the features indicated by the resource features 122 can be made accessible to the user in conjunction with accessing resources via the different browser. In another scenario, the user may use a different device and authenticate on the different device. In this other scenario, the features indicated by the resource features 122 can be made accessible to the user in conjunction with accessing resources via the different device.

Furthermore, by allowing the identity management service 114 to merge the features from an unauthenticated portion of a session (e.g., as indicated by the determined feature token 310) with the resource features 122, this offloads the burden from the computing device 102 and its applications 108. Instead, the applications 108 may be able to cause feature management and transfer between unauthenticated and authenticated portions of sessions by simply making a call to the feature transfer module 112.

Having discussed example details of the resource feature transfer techniques, consider now some example procedures to illustrate additional aspects of the techniques.

Example Procedures

This section describes example procedures for resource feature transfer techniques in one or more embodiments. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some embodiments the procedures may be performed by a suitably configured device, such as example computing device 102 of FIG. 1 that makes use of a feature transfer module 112, or example identity management service 114.

Figure 5:
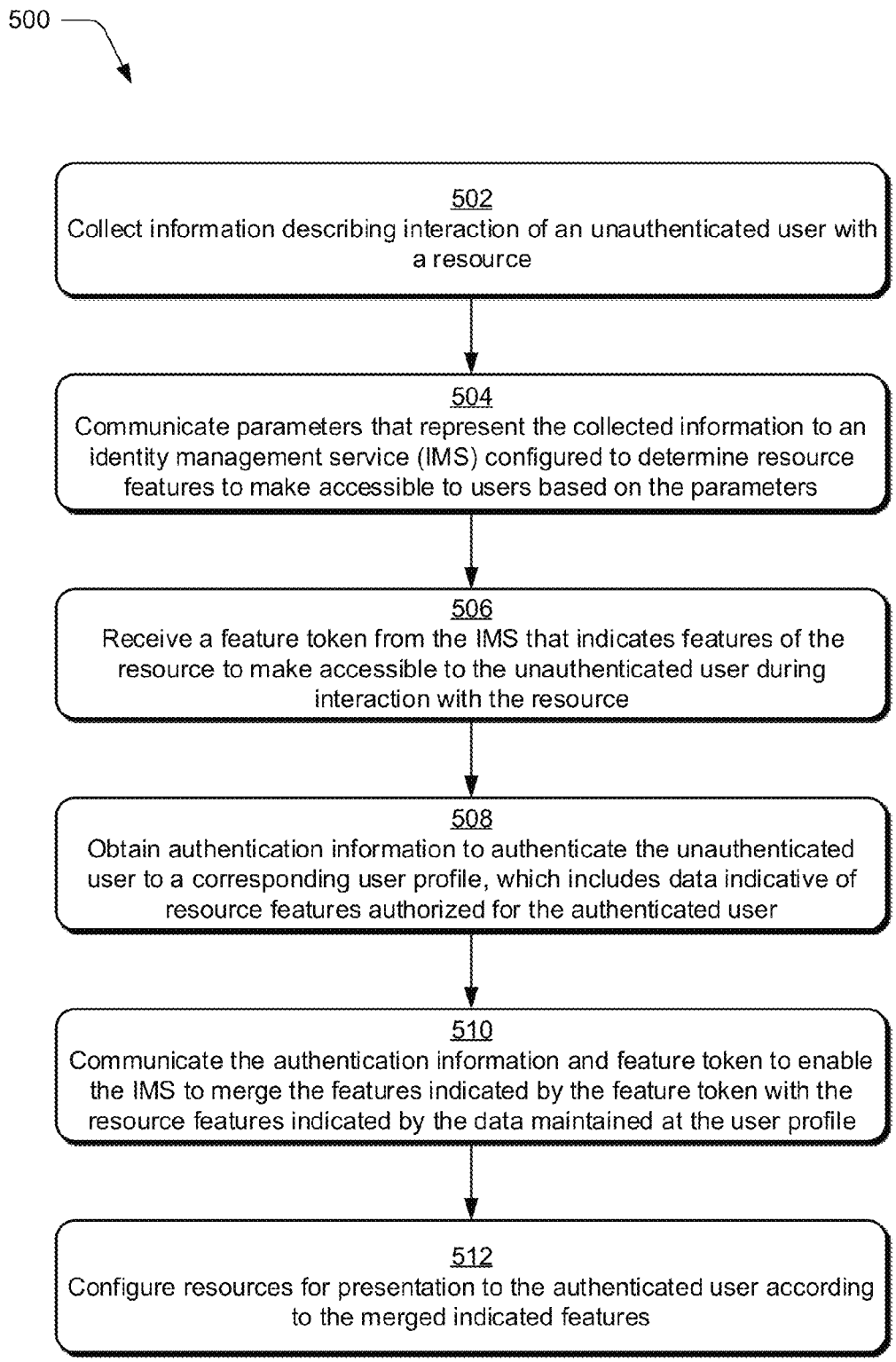
FIG. 5 is a flow diagram depicting an example procedure in accordance with one or more embodiments.

FIG. 5 depicts an example procedure 500 in which a user interacts with a resource during an unauthenticated portion of a resource interaction session. During the unauthenticated portion, resource features are made accessible to the user. When the user authenticates, the features made accessible to the user while unauthenticated are transferred to the authenticated portion so that the features are also accessible to the user while authenticated.

Information describing interaction of an unauthenticated user with a resource is collected (block 502). For example, the requested resource 208 is obtained by the computing device 102, and the feature transfer module 112 collects information describing interaction of an unauthenticated user of the computing device 102 with the requested resource 208. From the collected information, the feature transfer module 112 generates the feature-relevant parameters 302, examples of which are provided above.

Parameters that represent the collected information are communicated to an identity management service (block 504). In accordance with the principles discussed herein, the identity management service is configured to determine resource features to make accessible to users based on the parameters. For example, the feature transfer module 112 causes the computing device 102 to communicate the feature-relevant parameters 302 to the identity management service 114 over the network 116. Based on the feature-relevant parameters 302, the identity management service 114 is configured to determine which features of the requested resource to make accessible to the unauthenticated user.

A feature token is received from the identity management service that indicates the features of the resource that are to be made accessible to the unauthenticated user during interaction with the resource (block 506). For example, the computing device 102 receives the determined feature token 310 from the identity management service 114.

At some point during the interaction, authentication information is obtained to authenticate the user to a corresponding user profile (block 508). In accordance with the principles discussed herein, the user profile includes or has access to data indicative of resource features authorized for a user authenticated to the user profile. For example, the feature transfer module 112 obtains authentication information from the unauthenticated user of the computing device 102, such as an entered username and password. This authentication information is usable to authenticate the user to one of the user profiles 118. The user profiles 118 include the resource features 122, which indicate resource features authorized for the user when authenticated to the corresponding user profile 118.

The authentication information and the feature token are communicated to the identity management service (block 510). In accordance with the principles discussed herein, this information enables the identity management service to merge the features indicated by the feature token with the resource features indicated by the data maintained for the user profile. For example, the feature transfer module 112 causes the authentication information obtained at block 508 and the determined feature token 310 to be communicated to the identity management service 114.

Resources are configured for presentation to the authenticated user according to the merged indicated features (block 512). For example, one of the applications 108 of the computing device 102 configures the requested resource 208 for presentation to the authenticated user according to the merged indicated features. In so doing, the features that were accessible to the user of the computing device 102 during the unauthenticated portion of interaction with the requested resource 208 are transferred to the authenticated portion of interaction with the requested resource 208. In this way, the previously-accessible features are also made accessible to the user when authenticated.

Figure 6:
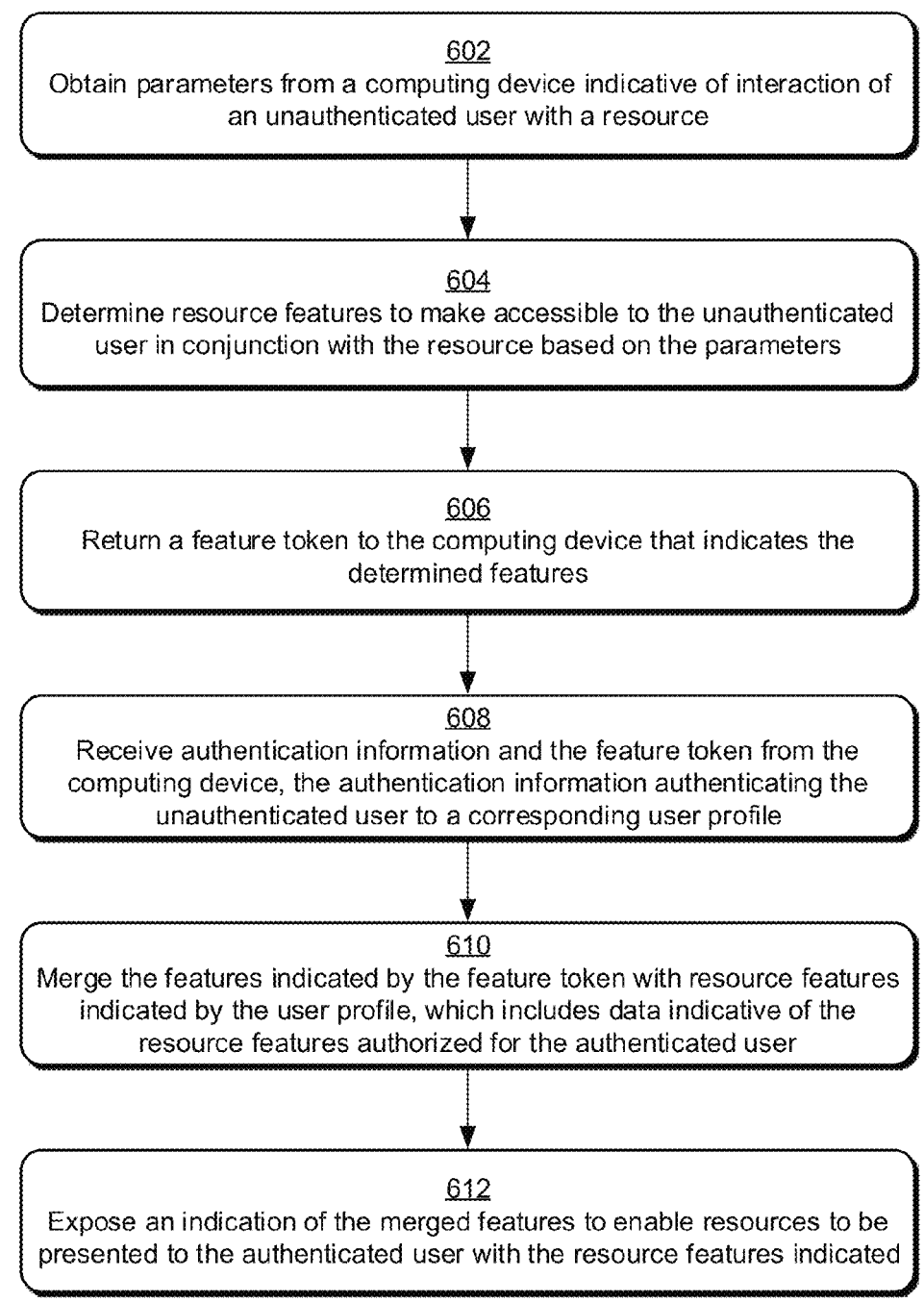
FIG. 6 is a flow diagram depicting another example procedure in accordance with one or more embodiments.

FIG. 6 depicts an example procedure 600 in which an identity management service provides indications of features that are to be made accessible to a user in conjunction with resources both when the user is unauthenticated and when the user is authenticated. The manner in which the identity management service manages feature provision enables transfer of resource features from unauthenticated user interaction sessions with resources to authenticated ones. In so doing, resources can be presented to users in a consistent manner, e.g., with consistent features during unauthenticated and authenticated interaction with a resource.

Parameters are obtained from a computing device that are indicative of user interaction of an unauthenticated user with a resource (block 602). For example, the identity management service 114 receives the feature-relevant parameters 302 from the computing device 102. The feature-relevant parameters 302 may be communicated to the identity management service 114 as at block 504, for instance. Further, the feature-relevant parameters 302 are indicative of user interaction of an unauthenticated user of the computing device 102 with the requested resource 208.

A determination is made regarding resource features to make accessible to the unauthenticated user in conjunction with the resource based on the parameters (block 604). For example, the identity management service 114 determines resource features to make accessible to the unauthenticated user of the computing device in conjunction with the requested resource 208. To do so, the identity management service 114 compares the feature-relevant parameters 302 to the feature rules 120. The feature rules 120 may specify that when one of the parameters has a certain value, a particular feature or features are to be made accessible to the corresponding user in conjunction with resources. In other words, the feature rules 120 map values of the feature-relevant parameters 302 to features that are to be determined for a corresponding user.

Regardless of which features are determined, a feature token is returned that indicates the determined features (block 606). For example, the identity management service 114 generates the determined feature token 310 to include the encoded features 312, which correspond to the features determined at block 604. The identity management service 114 then returns the determined feature token 310 to the computing device 102. The determined feature token 310 enables the requested resource 208 to be presented to the unauthenticated user with the encoded features 312.

As discussed above, the unauthenticated user at some point initiates a process to authenticate to a corresponding user profile. As part of doing so, authentication information and the feature token are received from the computing device (block 608). In accordance with the principles discussed herein, the authentication information authenticates the unauthenticated user to a corresponding user profile. For example, the identity management service 114 receives the authentication information and the determined feature token 310 communicated at block 510. The authentication information received (e.g., an indication of a username and password entered by the user of the computing device 102) are sufficient to enable the identity management service 114 to authenticate the unauthenticated user to one of the user profiles 118.

Features indicated by the feature token are merged with resource features indicated by the user profile (block 610). In accordance with the principles discussed herein, the user profiles include data that indicates resource features authorized for respective users. For example, the identity management service 114 merges the encoded features 312 of the determined feature token 310 with the resource features 122 of the user profile 118 that corresponds to the user of the computing device 102. In other words, the identity management service 114 updates the resource features 122 to also include the encoded features 312.

An indication of the merged features is exposed to enable resources to be configured for the authenticated user with the resource features indicated (block 612). For example, the identity management service exposes the resource features 122, which includes the features merged from the determined feature token 310. An application (e.g., a web browser) or module of the computing device 102 (e.g., the feature transfer module 112) may query the identity management service 114 to obtain information indicative of the resource features 122. Using this information, the application or module can configure a resource so that the features indicated by the resource features 122 are made accessible to the authenticated user while interacting with the resource.

Having described example procedures in accordance with one or more embodiments, consider now an example system and device that can be utilized to implement the various techniques described herein.

Example System and Device

Figure 7:
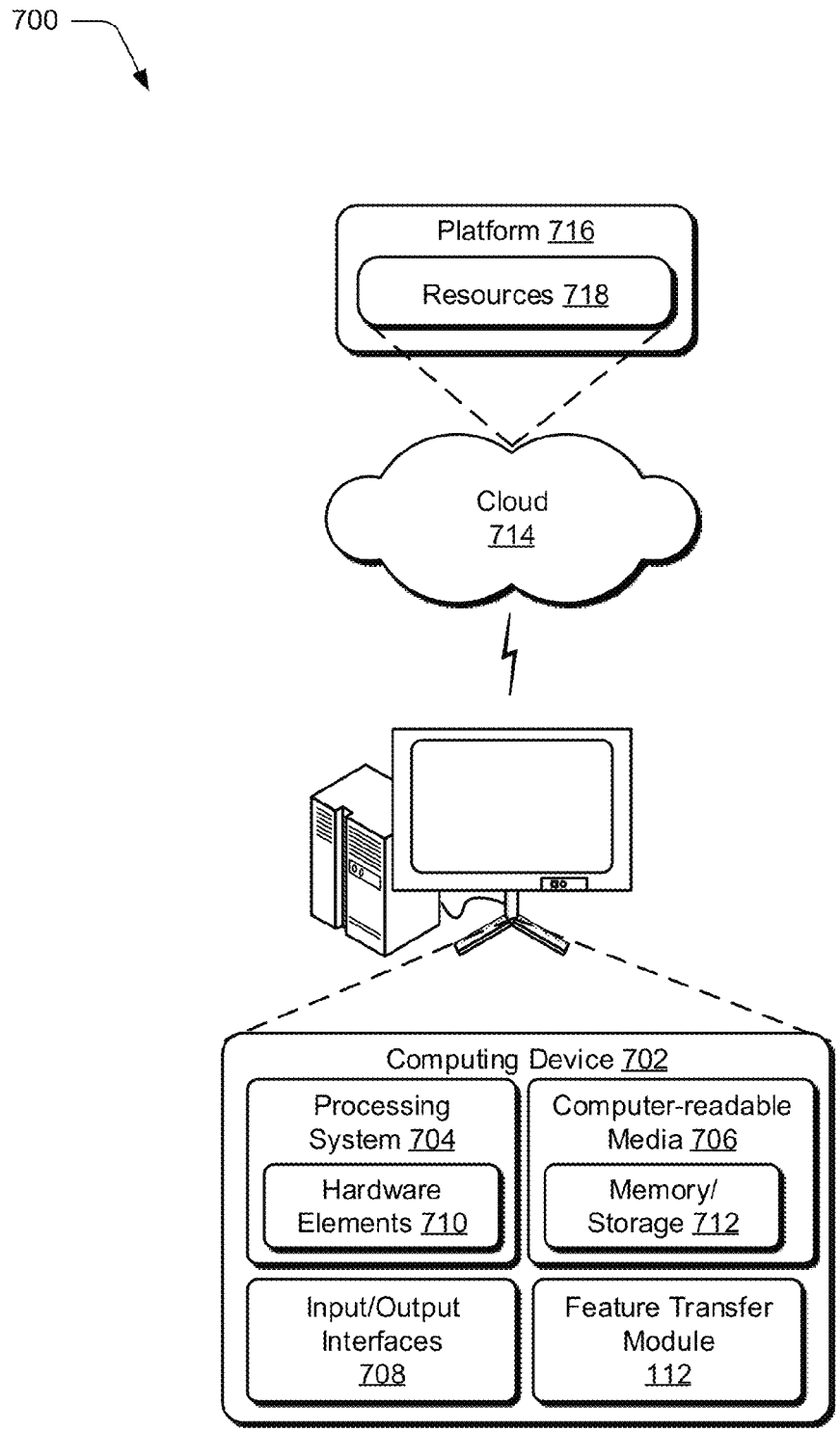
FIG. 7 illustrates an example system including various components of an example device that can be employed for one or more embodiments of the resource feature transfer described herein.

FIG. 7 illustrates an example system generally at 700 that includes an example computing device 702 that is representative of one or more computing systems and/or devices that may implement the various techniques described herein. This is illustrated through inclusion of the feature transfer module 112, which operates as described above. The computing device 702 may be, for example, a server of a service provider, a device associated with a client (e.g., a client device), an on-chip system, and/or any other suitable computing device or computing system.

The example computing device 702 includes a processing system 704, one or more computer-readable media 706, and one or more I/O interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An embodiment of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device to present a consistent user experience during unauthenticated and authenticated interaction of a user with resources, the method comprising:

communicating feature-relevant parameters to an identity management service, the feature-relevant parameters describing characteristics of interaction of an unauthenticated user of the computing device with at least one of the resources, the identity management service configured to determine features to make accessible to the unauthenticated user while interacting with the at least one resource;

receiving a feature token from the identity management service that indicates one or more determined features to make accessible to the unauthenticated user, the feature token enabling the at least one resource to be presented to the unauthenticated user with the one or more determined features;

responsive to obtaining authentication information to authenticate the unauthenticated user to a corresponding user profile, sending the authentication information and the feature token to the identity management service to merge the one or more determined features with authorized features indicated for the user profile; and obtaining an indication of merged features from the identity management service, the indication of merged features enabling the at least one resource to be presented to the authenticated user of the computing device with the one or more determined and the authorized features.

2. A method as described in claim 1, wherein the resources are web pages.

3. A method as described in claim 2, wherein the web pages are part of a web site.

4. A method as described in claim 1, further comprising using an application to configure the at least one resource with the one or more determined features and present the at least one resource.

5. A method as described in claim 1, further comprising using an application to configure the at least one resource with at least one of the determined or the authorized features and present the at least one resource.

6. A method as described in claim 1, further comprising determining the one or more determined features from resource features comprising different content accessible in conjunction with the at least one resource.

7. A method as described in claim 1, further comprising determining the one or more determined features from resource features comprising different functionality accessible in conjunction with the at least one resource.

8. A method as described in claim 1, wherein the at least one resource comprises an application.

9. A method as described in claim 1, further comprising:
obtaining the at least one resource, including a feature transfer module;
making a call to the feature transfer module to communicate the feature-relevant parameters to the identity management service; and
making another call to the feature transfer module to send the authentication information and the feature token to the identity management service to merge the one or more determined features with the authorized features indicated for the user profile.

10. A method as described in claim 1, further comprising presenting the at least one resource with at least one of the one or more determined features during both the unauthenticated and authenticated interaction.

11. A method as described in claim 1, further comprising:
collecting information indicative of the characteristics of interaction of the unauthenticated user with the at least one resource; and
generating the feature-relevant parameters from the collected information.

12. A method as described in claim 1, wherein the feature-relevant parameters include at least one of:
a user identifier parameter to identify the unauthenticated user in conjunction with a current interaction session involving the at least one resource;
an application type parameter to identify an application of the computing device used to present the at least one resource during the current interaction session;
an operating system type parameter to identify an operating system of the computing device;
a session identifier parameter to identify the current interaction session;
a content identifier parameter to identify the resource, the content identifier assigned to the resource by the identity management service;
a segment identifier parameter to identify one or more segments associated with the interaction of the unauthenticated user with the at least one resource, the one or more segments representing corresponding features that are to be determined for the unauthenticated user; or
an activated feature indicator parameter to indicate resource features that are already accessible to the unauthenticated user in the current interaction session in conjunction with the at least one resource.

13. A method as described in claim 12, wherein the current interaction session is a single browsing session during which a web browser is used to navigate to different web pages.

14. A method implemented by an identity management service to deliver a consistent user experience during unauthenticated and authenticated interaction of users with resources, the method comprising:
obtaining feature-relevant parameters that describe characteristics of interaction of an unauthenticated user of a computing device with at least one of the resources;
determining features to make accessible to the unauthenticated user while interacting with the at least one resource based on a comparison of the feature-relevant parameters to feature rules;
returning a feature token to the computing device that indicates one or more determined features, the feature token enabling the at least one resource to be presented to the unauthenticated user with the one or more determined features;
responsive to receiving, from the computing device, the feature token and authentication information that authenticates the unauthenticated user to a corresponding user profile, merging the one or more determined features with authorized features indicated for the user profile; and
exposing an indication of merged features that is retrievable by the computing device, the indication of merged features enabling the at least one resource to be presented to the authenticated user with the one or more determined features and the authorized features.

15. A method as described in claim 14, further comprising maintaining a plurality of user profiles that include information indicative of respective resource features authorized for each user profile.

16. A method as described in claim 14, further comprising comparing the feature-relevant parameters to the feature rules which map parameter values to resource features that are to be determined for a corresponding user.

17. A method as described in claim 14, wherein merging the one or more determined features with the authorized features indicated for the user profile comprises updating the authorized features to include the one or more determined features.

18. A method as described in claim 14, wherein the exposed indication of merged features is retrievable by at least one additional computing device associated with the authenticated user.

* * * * *